United States Patent
Matesic et al.

(10) Patent No.: US 10,179,571 B1
(45) Date of Patent: Jan. 15, 2019

(54) SPHERICAL ROTARY CLEANING DEVICE FOR CAMERA OR SENSOR

(71) Applicant: GM Global Technology Operations LLC, Detroit, MI (US)

(72) Inventors: Brandon K. Matesic, Swartz Creek, MI (US); Fred W. Huntzicker, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/649,012

(22) Filed: Jul. 13, 2017

(51) Int. Cl.
| | | |
|---|---|---|
| *G03B 17/00* | (2006.01) | |
| *B60S 1/56* | (2006.01) | |
| *B60S 1/04* | (2006.01) | |
| *B60S 1/52* | (2006.01) | |
| *B60R 1/00* | (2006.01) | |
| *G02B 27/00* | (2006.01) | |
| *G03B 17/02* | (2006.01) | |

(52) U.S. Cl.
CPC ............... *B60S 1/56* (2013.01); *B60R 1/00* (2013.01); *B60S 1/0411* (2013.01); *B60S 1/52* (2013.01); *G02B 27/0006* (2013.01); *G03B 17/02* (2013.01)

(58) Field of Classification Search
USPC ........................................................ 396/427
See application file for complete search history.

(56) References Cited

U.S. PATENT DOCUMENTS

| 5,068,770 | A  * | 11/1991 | Baziuk ............... B60Q 1/0005 |
| | | | 15/250.01 |
| 6,527,000 | B1 * | 3/2003 | Randmae ............... B08B 3/024 |
| | | | 134/102.1 |
| 9,821,346 | B1 * | 11/2017 | Baki ........................ F16H 1/06 |
| 2008/0072393 | A1 * | 3/2008 | Tanaka ..................... A47L 1/02 |
| | | | 15/250.03 |
| 2011/0292212 | A1 | 12/2011 | Tanabe et al. |
| 2014/0036132 | A1 * | 2/2014 | Pawlowski .......... H04N 5/2171 |
| | | | 348/335 |
| 2014/0270379 | A1 | 9/2014 | Snider |
| 2015/0201826 | A1 * | 7/2015 | Hsu .................... A61B 1/00135 |
| | | | 600/121 |
| 2017/0192226 | A1 * | 7/2017 | Eineren ............. G02B 27/0006 |
| 2017/0210351 | A1 * | 7/2017 | Ghannam ................ B60S 1/50 |
| 2017/0259789 | A1 * | 9/2017 | McAndrew ............. B60S 1/528 |
| 2017/0313286 | A1 * | 11/2017 | Galera ..................... B60S 1/56 |

(Continued)

*Primary Examiner* — Rodney E Fuller (57) ABSTRACT

A self-cleaning camera device includes: a housing that includes a reservoir configured to hold a fluid within the housing; a frusto-spherical member that is transparent, that is located within the housing; an electric motor configured to rotate the frusto-spherical member in a predetermined direction about an axis; a support member that (i) extends through a second opening of the frusto-spherical member and into the inner cavity of the frusto-spherical member and (ii) does not rotate with the frusto-spherical member; a camera that is located on the support member within an inner cavity of the frusto-spherical member and that includes a lens that one of: (i) faces a first opening in the housing; (ii) extends into the first opening in the housing; and (ii) extends outwardly past the first opening in the housing; and a wiping member is configured to wipe the fluid from the exterior surface of the frusto-spherical member.

19 Claims, 9 Drawing Sheets

(56) References Cited

U.S. PATENT DOCUMENTS

2017/0313287 A1* 11/2017 Davies ................... B60S 1/56
2017/0326600 A1* 11/2017 Baki ...................... F16H 1/06
2017/0349147 A1* 12/2017 Blank ................ B60S 1/0848

* cited by examiner

SPHERICAL ROTARY CLEANING DEVICE FOR CAMERA OR SENSOR

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to cameras of vehicles and more particularly to self-cleaning cameras and sensors of vehicles.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

An infotainment system may display video generated based on input from one or more sensors and/or cameras under some circumstances. For example, an infotainment system may display video from a camera capturing a field of view behind the vehicle when the vehicle is in reverse.

SUMMARY

In a feature, a self-cleaning camera device for a vehicle is described. The self-cleaning camera device includes: a housing that has a first opening and that includes a reservoir configured to hold a fluid within the housing; a frusto-spherical member that is transparent, that is located within the housing, that includes an inner cavity defined by an inner surface, and that includes an exterior surface; an electric motor configured to rotate the frusto-spherical member in a predetermined direction about an axis, where the axis is perpendicular to a second opening in the frusto-spherical member; a support member that (i) extends through the second opening of the frusto-spherical member and into the inner cavity of the frusto-spherical member and (ii) does not rotate with the frusto-spherical member; a camera that is located on the support member within the inner cavity of the frusto-spherical member and that includes a lens that one of: (i) faces the first opening in the housing; (ii) extends into the first opening in the housing; and (ii) extends outwardly past the first opening in the housing; and a wiping member that directly contacts the exterior surface of the frusto-spherical member and that is configured to wipe the fluid from a portion of the exterior surface of the frusto-spherical member before the portion of the exterior surface of the frusto-spherical member is rotated in front of the lens of the camera.

In further features, a nozzle sprays the fluid onto a second portion of the frusto-spherical member before the second portion of the frusto-spherical member rotates to the wiping member.

In further features, the nozzle sprays the fluid onto the second portion of the frusto-spherical member outside of a field of view (FOV) of the camera.

In further features, an electric pump draws the fluid from the reservoir in the housing and pumps the fluid to the nozzle.

In further features, the electric pump draws the fluid from the reservoir in the housing through a filter.

In further features, a second portion of the exterior surface of the frusto-spherical member contacts the fluid within the reservoir before the second portion of the frusto-spherical member rotates to the wiping member.

In further features, an electric pump that pumps the fluid from a second reservoir into the reservoir of the housing.

In further features, a cupping member is fixed to the frusto-spherical member and includes a first shaft that is coupled to a second shaft of the electric motor.

In further features, the housing includes a support member that supports the first shaft of the cupping member.

In further features, a second cupping member is fixed to the frusto-spherical member.

In further features: the second cupping member includes a flange that extends outwardly away from the frusto-spherical member; and the housing includes a support member that supports the flange of the second cupping member.

In further features: the support member includes a portion that extends away from the axis and toward the first opening in the housing; and the camera is located on the portion of the support member that extends away from the axis and toward the first opening in the housing.

In further features, the wiping member includes a convex surface that contacts the exterior surface of the frusto-spherical member.

In further features, a first plane of the first opening of the housing is perpendicular to a second plane of the second opening of the frusto-spherical member.

In further features, the housing includes a sealing member around the first opening in the housing.

In further features, the sealing member directly contacts at least a portion of the frusto-spherical member.

In further features, the sealing member does not contact any portion of the frusto-spherical member.

In further features, the fluid is washer fluid.

In further features, the camera is arranged to capture images of behind the vehicle, and a control module is configured to begin applying power to the motor when a transmission of the vehicle is in reverse.

In further features, the camera is arranged to capture images outside of the vehicle, and a control module is configured to begin applying power to the motor when an enabling condition is satisfied.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more camera and/or sensor modules that generate signals based on objects around the vehicle. For example, the vehicle may include a forward facing camera module that captures images in front of the vehicle, a rear facing camera module that captures images behind the vehicle, and/or one or more other cameras. Additionally or alternatively, the vehicle may include one or more sensor modules (e.g., radar, LIDAR, sonar, etc.) that generate signals based on objects located in front of, behind, beside, over, or under the vehicle.

Coverings of such camera modules and sensor modules may be exposed to the environment. Debris and other objects may contact (and stick to) the coverings. Objects on the covering of a camera or sensor module may obstruct the view of the camera or sensor module.

According to the present disclosure, a camera or sensor module is implemented within a spherical member. A motor rotates the spherical member, and the spherical member does not obstruct the view of the camera or sensor. For example, the spherical member may be transparent such that the spherical member does not obstruct the view of a camera module within the spherical member.

Washer fluid is supplied on an exterior surface of the spherical member while the spherical member rotates. For example, washer fluid may be applied to the exterior surface of the spherical member by an nozzle or via a portion of the spherical member sitting in a bath of washer fluid. The washer fluid is applied on a portion of the spherical member that is outside of the field of view of the camera or sensor module, such as behind or below the camera or sensor module.

Washer fluid loosens any objects that may be present on the spherical member. After washer fluid is applied, a wiping member wipes the washer fluid (and objects) off of the exterior surface of the spherical member. The wiped portion of the exterior surface of the spherical member then rotates back in front of the camera or sensor module. As a result, cleaned portions of the spherical member are rotated into the field of view of the camera or sensor module.

Figure 1:
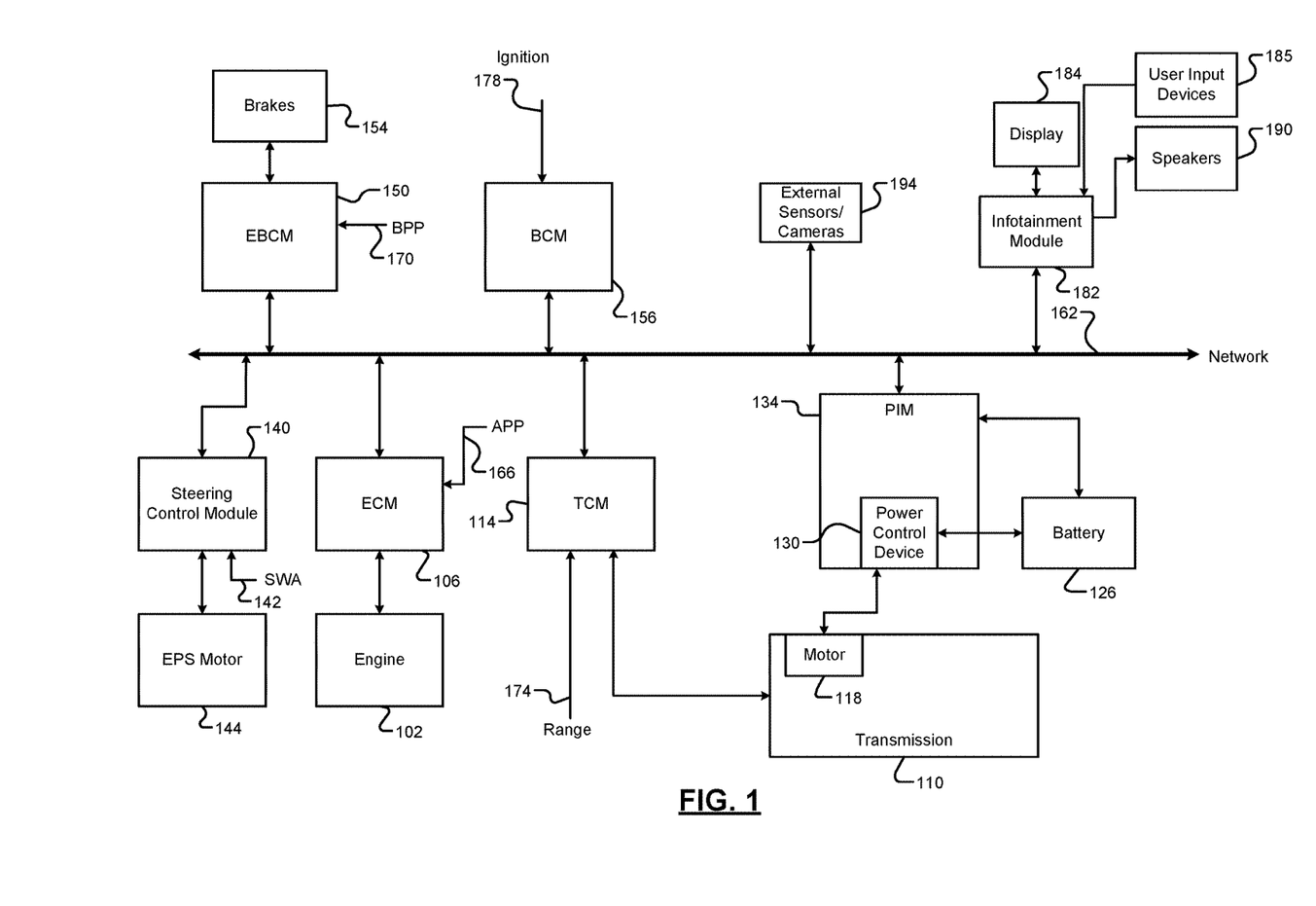
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102 based on one or more driver inputs. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors that are connected to a drivetrain of the vehicle. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. A body control module (BCM) 156 may control various devices and operations of the vehicle. Modules of the vehicle may share parameters via a network 162, such as a controller area network (CAN). The CAN may also be referred to as a car area network. For example, the network 162 may include one or more data buses. Various parameters may be made available by a given control module to other control modules via the network 162.

The driver inputs may include, for example, an accelerator pedal position (APP) 166 measured by an APP sensor, which may be provided to the ECM 106. A brake pedal position (BPP) 170 may be measured by a BPP sensor and provided to the EBCM 150. A range selection 174 may be provided to the TCM 114 by a transmission range selector, such as a park, reverse, neutral, drive range selector. An ignition signal 178 may be provided to the BCM 156. For example, the ignition signal 178 may be received via an ignition key, button, or switch. At a given time, the ignition signal 178 may be one of off, accessory, run, or crank. The BCM 156 may start the engine 102 when the ignition signal 178 transitions from off to crank. The ECM 106 may shut down the engine 102 when the ignition signal 178 transitions from run to off or accessory.

The vehicle system also includes an infotainment module 182. The infotainment module 182 controls what is displayed on a display 184. The display 184 may be a touchscreen display in various implementations and transmit signals indicative of user input to the display 184 to the infotainment module 182. The Infotainment module 182 may additionally or alternatively receive signals indicative of user input from one or more other user input devices 185, such as one or more switches, buttons, knobs, etc.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

The infotainment module 182 may also receive input from one or more external sensors and camera modules, generally illustrated in FIG. 1 by 194. For example, the infotainment module 182 may display video, images, and/or alerts on the display 184 based on input from the external sensors and camera modules 194. Examples of the external sensors and camera modules 194 are discussed below in FIG. 2.

Figure 2:
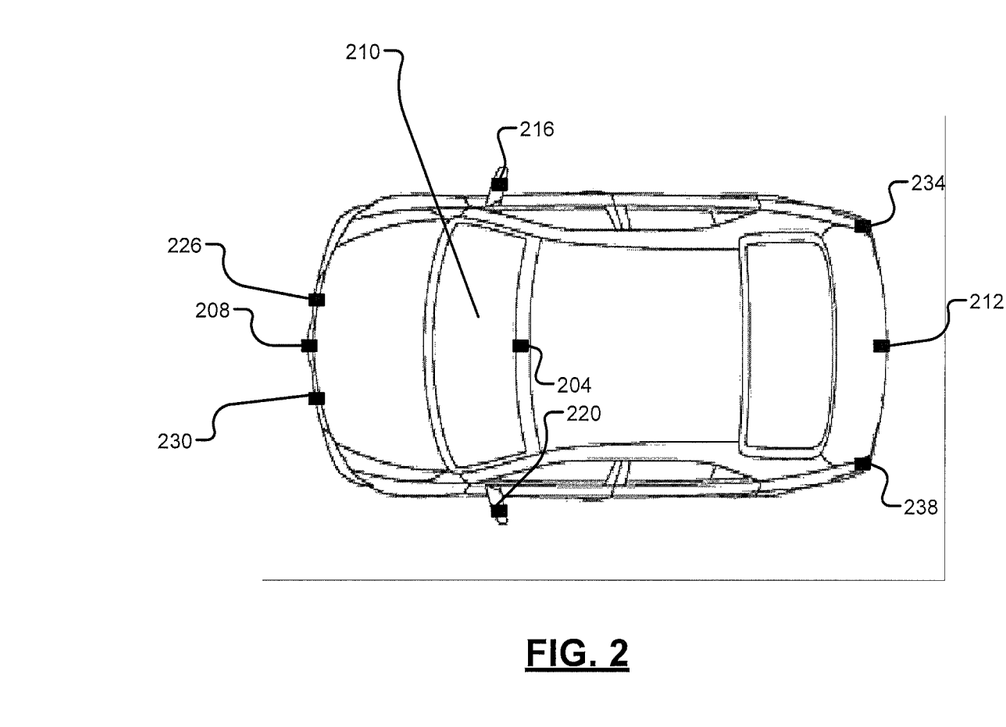
FIG. 2 is a functional block diagram of an example vehicle including examples of external sensor and camera modules.

Referring now to FIG. 2, a functional block diagram of a vehicle including examples of external sensor and camera modules is presented. While the example of a car is shown, the present disclosure is also applicable to trucks, utility vehicles, vans, station wagons, and other types of vehicles.

The external sensor and camera modules 194 include one or more camera modules positioned to capture images and video outside of (external to) the vehicle and/or one or more sensor modules generating signals based on objects outside of (external to) the vehicle. For example, a forward facing camera module 204 captures images and video of images within a predetermined field of view (FOV) in front of the vehicle. A front camera module 208 may also capture images and video within a predetermined FOV in front of the vehicle. The front camera module 208 may capture images and video within a predetermined distance of the front of the vehicle and may be located at the front of the vehicle (e.g., in a front fascia, grille, or bumper). The forward facing camera module 204 may be located more rearward than the front camera module 208, such as with a rear view mirror mounted on a windshield 210 of the vehicle.

A rear camera module 212 captures images and video within a predetermined FOV behind the vehicle. The rear camera module 212 may capture images and video within a predetermined distance behind vehicle and may be located at the rear of the vehicle, such as near a rear license plate. A right camera module 216 captures images and video within a predetermined FOV to the right of the vehicle. The right camera module 216 may capture images and video within a predetermined distance to the right of the vehicle and may be located, for example, under the right side rear view mirror. In various implementations, the right side rear view mirror may be omitted, and the right camera module 216 may be located near where the right side rear view mirror would normally be located.

A left camera module 220 captures images and video within a predetermined FOV to the left of the vehicle. The left camera module 220 may capture images and video within a predetermined distance to the left of the vehicle and may be located, for example, under the left side rear view mirror. In various implementations, the left side rear view mirror may be omitted, and the left camera module 220 may be located near where the left side rear view mirror would normally be located.

The external sensors and camera modules 194 additionally or alternatively include one or more other sensors, such as radar sensor modules, sonar sensor modules, light imaging distance and ranging (LIDAR) sensor modules, etc. For example, the vehicle may include one or more forward facing radar sensor modules, such as forward facing sensor modules 226 and 230. The vehicle may include one or more side blind zone radar sensor modules, such as right blind zone radar sensor module 234 and left blind zone radar sensor module 238. While examples and locations of camera modules and sensor modules is provided, the vehicle may include a greater or fewer number of camera modules and/or sensor modules and/or one or more different types of camera modules and/or sensor modules Radar sensor modules transmit radar signals within a predetermined FOV and identify objects within the predetermined FOV based on signals reflected back by objects within the predetermined FOV. For example, the right blind zone radar sensor module 234 transmits radar signals within a predetermined right blind zone FOV. The right blind zone radar sensor module 234 identifies objects within the predetermined right blind zone FOV based on signals reflected back by objects within the predetermined right blind zone FOV. Similarly, the left blind zone radar sensor module 238 transmits radar signals within a predetermined left blind zone FOV. The left blind zone radar sensor module 238 identifies objects within the predetermined left blind zone FOV based on signals reflected back by objects within the predetermined left blind zone FOV.

Figure 3:
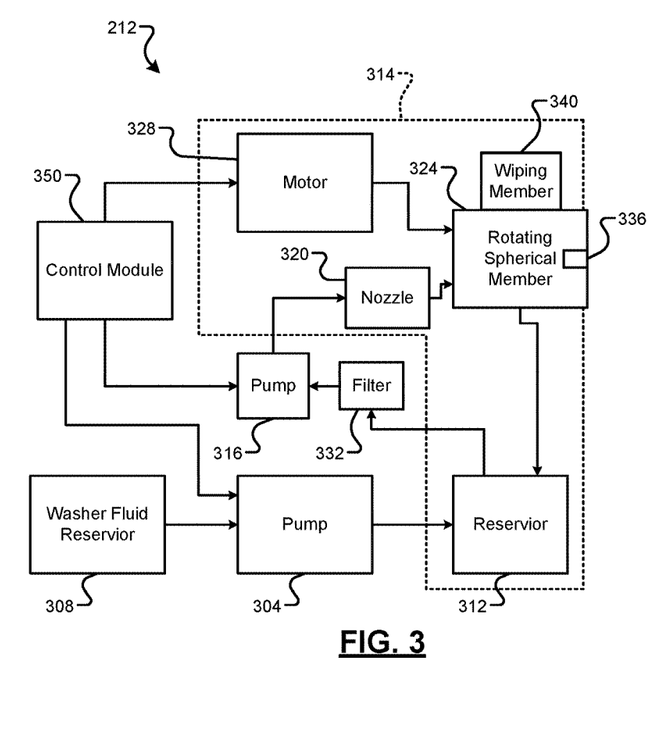
FIGS. 3 and 4 are functional block diagrams of example self-cleaning camera systems.

According to the present disclosure, one or more sensor modules and/or camera modules (e.g., the rear camera module 212) is self-cleaning. FIG. 3 is a functional block diagram of an example self-cleaning camera system.

Referring now to FIG. 3, a first pump 304 draws washer fluid from a washer fluid reservoir 308 and pumps the washer fluid to a camera reservoir 312 within a housing 314 of the rear camera module 212. The first pump 304 is an electrical pump that operates using power, for example, from a battery. While the example of the rear camera module 212 will be discussed, the following is equally applicable to other camera modules and sensor modules of the vehicle. The first pump 304 may also pump washer fluid from the washer fluid reservoir 308 to one or more washer fluid nozzles, such as one or more washer fluid nozzles that spray washer fluid onto a front windshield of the vehicle and/or one or more washer fluid nozzles that spray washer fluid onto a rear windshield of the vehicle.

A second pump 316 draws washer fluid from the camera reservoir 312 and pumps the washer fluid to a cleaning nozzle 320 of the rear camera module 212. The second pump 316 is an electrical pump that operates using power, for example, from a battery. The cleaning nozzle 320 sprays washer fluid onto a portion of an exterior surface of a rotating spherical member 324 of the rear camera module 212 as an electric motor 328 rotates the rotating spherical member 324. The electric motor 328 operates using power, for example, from the battery. In various implementations, the second pump 316 may draw washer fluid from the camera reservoir 312 through a filter 332. The filter 332 may include openings that each have a predetermined length and a predetermined width. The filter 332 may therefore filter objects that are greater than the predetermined length and/or the predetermined width from the washer fluid. The filter 332, however, may be omitted in various implementations.

A camera 336 is implemented within (i.e., inside of) the rotating spherical member 324. The camera 336 remains oriented in a fixed direction and does not rotate with the rotating spherical member 324. The camera 336 has a predetermined FOV and captures images outside of the vehicle. In the example of the rear camera module 212, as discussed above, the camera 336 captures images of behind the vehicle. The portion of the rotating spherical member 324 where the cleaning nozzle 320 sprays washer fluid is located outside of the predetermined FOV of the camera 336.

The rotating spherical member 324 is transparent and may be made of, for example, transparent plastic or glass. The rotating spherical member 324 may be frusto-spherical, as discussed further below. The spherical shape of the rotating spherical member 324 limits light refraction angle and limits distortion of the images captured by the camera 336.

The exterior surface of the rotating spherical member 324 is exposed to environment such that debris and other objects may contact the exterior surface of the rotating spherical member 324. Objects on the exterior surface of the rotating spherical member 324 may obstruct the view of the camera 336. Washer fluid on the exterior surface of the rotating spherical member 324 may loosen objects present on the exterior surface of the rotating spherical member 324 for removal.

A wiping member 340 is held (e.g., by the housing 314) in direct contact with the rotating spherical member 324. The wiping member 340 is located between the location where washer fluid is sprayed (or contacts) the exterior surface of the rotating spherical member 324 and a boundary of the predetermined FOV of the camera 336 in the direction of rotation of the rotating spherical member 324. The wiping member 340 wipes washer fluid (and objects) on the exterior surface of the rotating spherical member 324, thereby cleaning the exterior surface of the rotating spherical member 324. Cleaned portions of the rotating spherical member 324 then rotate back into the predetermined FOV of the camera 336. Washer fluid (and objects) wiped from the exterior surface of the rotating spherical member 324 may return (e.g., fall) to the camera reservoir 312.

Figure 4:
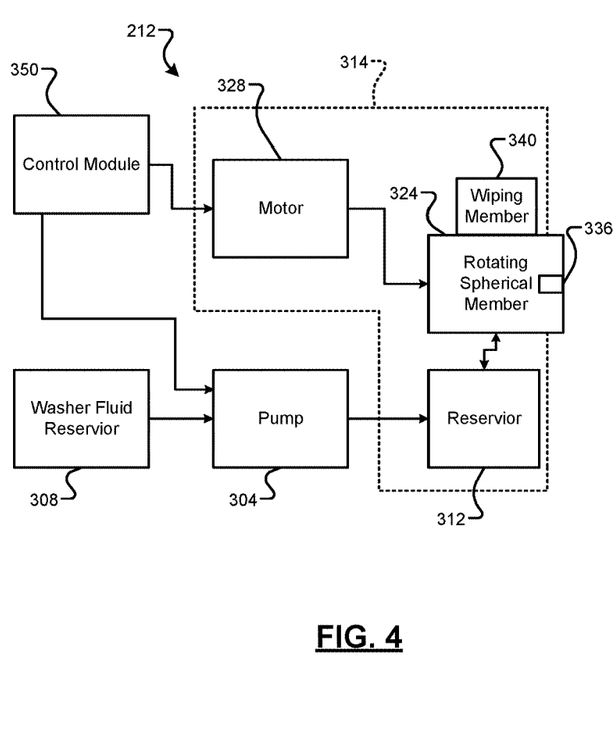

FIG. 4 is a functional block diagram of an example self-cleaning camera system. Referring now to FIG. 4, in various implementations, the second pump 316, the filter 332, and the cleaning nozzle 320 may be omitted. In this example, a portion (e.g., a bottom portion) of the rotating spherical member 324 may sit within washer fluid within the camera reservoir 312.

Referring now to FIGS. 3 and 4, a control module 350 may control operation (on or off, speed, etc.) of the first pump 304, the second pump 316, and the electric motor 328. For example, the control module 350 may maintain the electric motor 328 (and the second pump 316) on continuously while the engine 102 is on. Alternatively, the control module 350 may turn the electric motor 328 (and the second pump 316) on when one or more enabling conditions are satisfied and turn the motor (and the second pump 316) off when one or more of the enabling conditions are not satisfied. For example, in the example of the rear camera module 212, the control module 350 may turn the electric motor 328 (and the second pump 316) on when the transmission 110 is in reverse and turn the electric motor 328 (and the second pump 316) off when the transmission 110 is not in reverse. As another example, the control module 350 may turn the electric motor 328 (and the second pump 316) in response to a determination that an image captured by the camera 336 is obstructed by one or more objects on the exterior surface of the rotating spherical member 324. As another example, the control module 350 may turn the electric motor 328 (and the second pump 316) for a predetermined period each time a predetermined period has passed.

The control module 350 may operate the electric motor 328 at a fixed predetermined speed. The control module 350 may also operate the second pump 316 at a fixed predetermined speed. In various implementations, the control module 350 may selectively vary the speed of the electric motor 328 and/or the second pump 316 based on one or more operating conditions. For example, the control module 350 may increase the speed of the electric motor 328 and/or the second pump 316 as a vehicle speed increases. The control module 350 may decrease the speed of the electric motor 328 and/or the second pump 316 as the vehicle speed decreases. The control module 350 may, however, limit the speed of the electric motor 328 and/or the speed of the second pump 316 to predetermined minimum speeds and predetermined maximum speeds.

The control module 350 may turn the first pump 304 on when one or more enabling conditions are satisfied and turn the first pump 304 off when one or more of the enabling conditions are not satisfied. For example, a washer fluid level sensor may measure a level of washer fluid within the camera reservoir 312, and the control module 350 may turn the first pump 304 on when the level of washer fluid within the camera reservoir 312 is less than a predetermined level. The control module 350 may turn the first pump 304 off when the level of washer fluid in the camera reservoir 312 is greater than the predetermined level. As another example, the control module 350 may turn the first pump 304 on for a predetermined period each time the vehicle is turned on, such as each time the ignition signal 178 transitions from off to accessory or crank.

Figure 5:
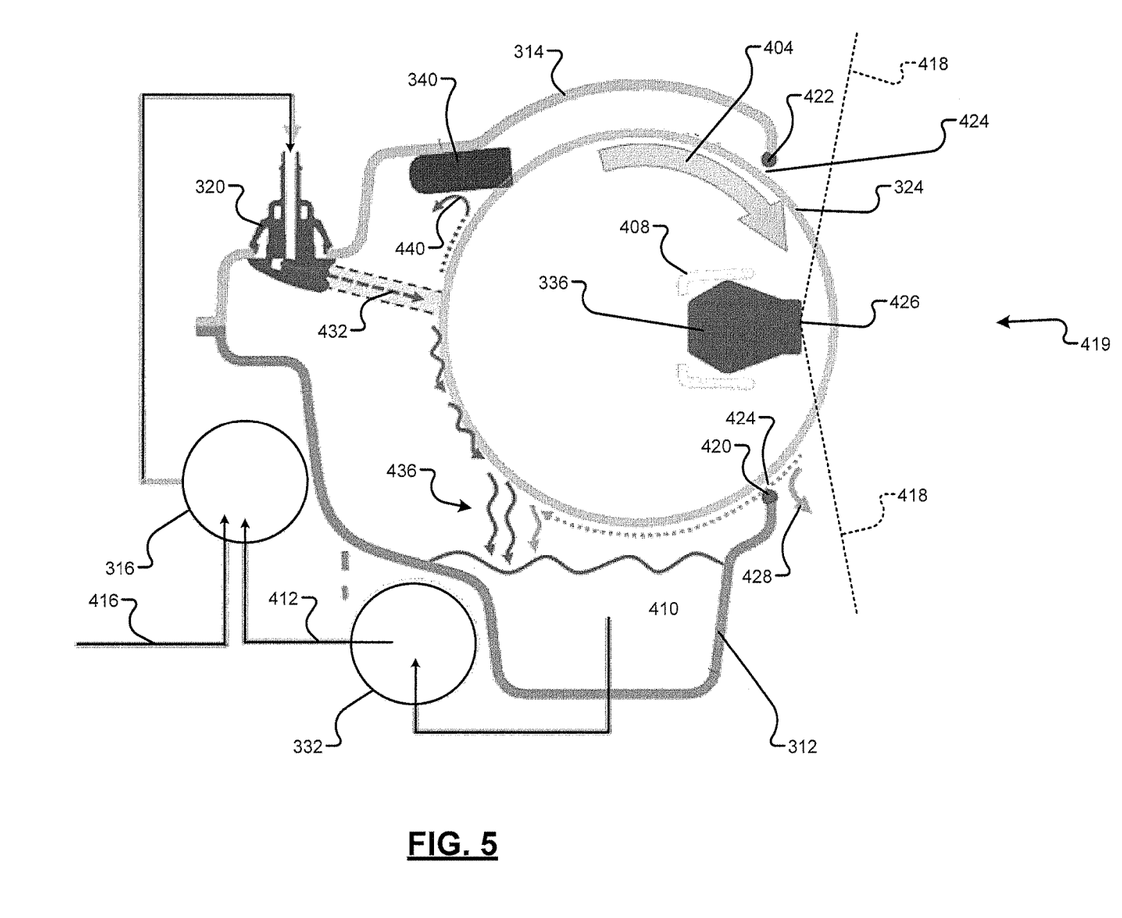
FIGS. 5 and 6 are functional block diagrams including an example cross-sectional side views of self-cleaning camera devices.
Figure 6:
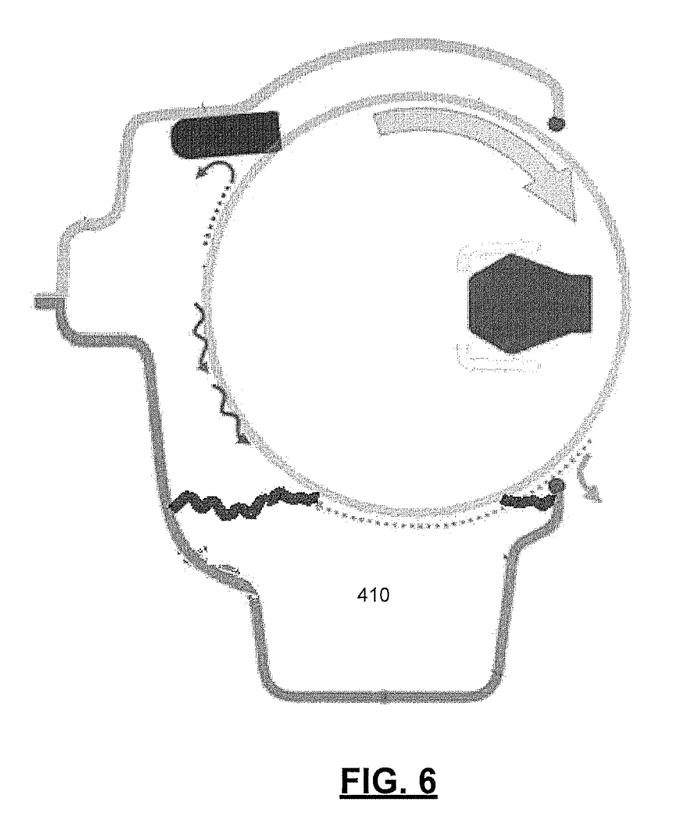

FIG. 5 is a functional block diagram including an example cross-sectional (right) side view of a self-cleaning camera device of the example self-cleaning camera system of FIG. 3. FIG. 6 is a functional block diagram including an example cross-sectional (right) side view of a self-cleaning camera device of the example self-cleaning camera system of FIG. 4.

Referring now to FIGS. 5 and 6, the direction of rotation of the rotating spherical member 324 is illustrated by arrow 404. The rotating spherical member 324 includes an inner surface that defines an inner cavity of the rotating spherical member 324. The camera 336 is maintained in a fixed position within the inner cavity of the rotating spherical member 324 via a support member 408. An example of washer fluid in the camera reservoir 312 is illustrated by 410. As shown, the camera reservoir 312 may be formed in a bottom of the housing 314.

The second pump 316 may receive washer fluid from (i) the camera reservoir 312 via a first washer fluid path 412 and (ii) from the washer fluid reservoir 308 via a second washer fluid path 416. In various implementations, the second pump 316 may receive washer fluid via the second washer fluid path 416 directly from the washer fluid reservoir 308 or the pump 304 may pump washer fluid to the second pump 316 via the second washer fluid path 416.

A portion of the rotating spherical member 324 may extend through an opening in the housing 314. A portion of the camera 336, such as a lens 426 of the camera 336 and/or one or more light receiving portions of the camera, extends outwardly past the opening in the housing 314, extends into the opening in the housing 314, or faces the opening in the housing 314. An example FOV of the camera 336 is illustrated by dashed lines 418. For example only, the FOV of the camera 336 may be approximately 170 degrees vertically and horizontally. The FOV of the camera 336, however, may be greater or lesser vertically and/or horizontally.

Objects may contact the portion of the rotating spherical member 324 as illustrated by 419. The housing 314 may include a sealing member located around a peripheral edge of the opening. The sealing member may include a lower portion 420 on a lower portion of the peripheral edge of the opening and an upper portion 422 on an upper portion of the peripheral edge of the opening. For example only, the sealing member may be made of, for example, rubber or another suitable material. While the existence of a gap 424 between the sealing member and the rotating spherical member 324 is illustrated, the gap 424 may be omitted, and the rotating spherical member 324 may contact the sealing member. As the rotating spherical member 324 rotates, the lower portion 420 of the sealing member may remove one or more objects from the rotating spherical member 324, as indicated by arrow 428.

After passing the lower portion 420 of the sealing member, washer fluid contacts the exterior surface of the rotating spherical member 324 outside of the FOV of the camera 336. For example, in the example of FIG. 5, the cleaning nozzle 320 sprays washer fluid onto a rear portion of the rotating spherical member 324, the washer fluid being illustrated by 432. The cleaning nozzle 320 may spray the washer fluid in a fan horizontally, for example, to reach further toward or to edges of the rotating spherical member 324. In the example of FIG. 6, a bottom portion of the rotating spherical member 324 sits within the washer fluid 410 within the camera reservoir 312. Washer fluid and objects washed from the rotating spherical member 324 falls via gravity, as indicated by arrows 436, into the camera reservoir 312.

The wiping member 340 directly contacts the exterior surface of the rotating spherical member 324. After washer fluid is on the exterior surface of the rotating spherical member 324, the wiping member 340 wipes washer fluid and/or objects away from the exterior surface of the rotating spherical member 324, as indicated by arrow 440. In various implementations, the wiping member 340 may be made of a rubber, such as the same material as a windshield wiper of the front and/or rear windshield.

Figure 7:
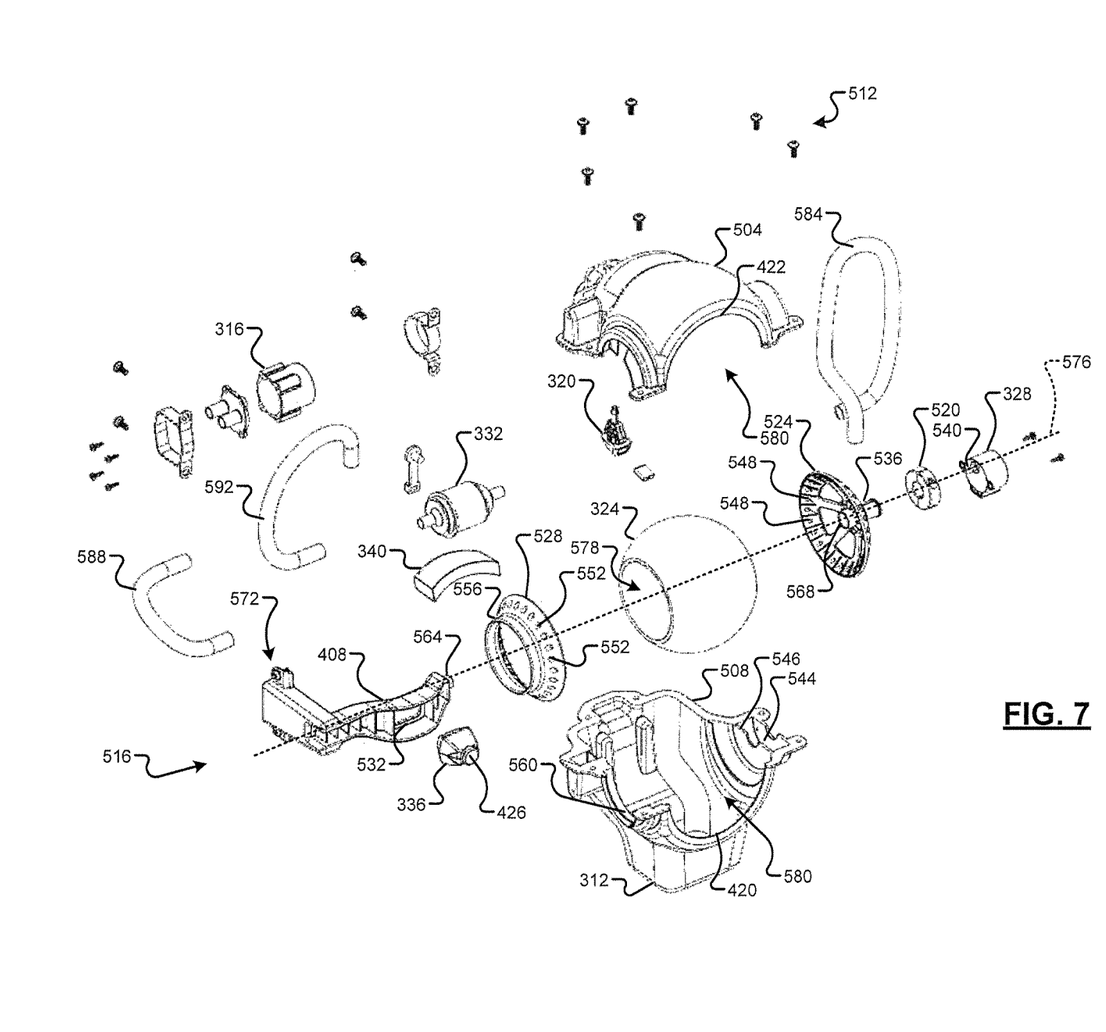
FIG. 7 is an exploded view of an example implementation of a self-cleaning camera device.
Figure 8:
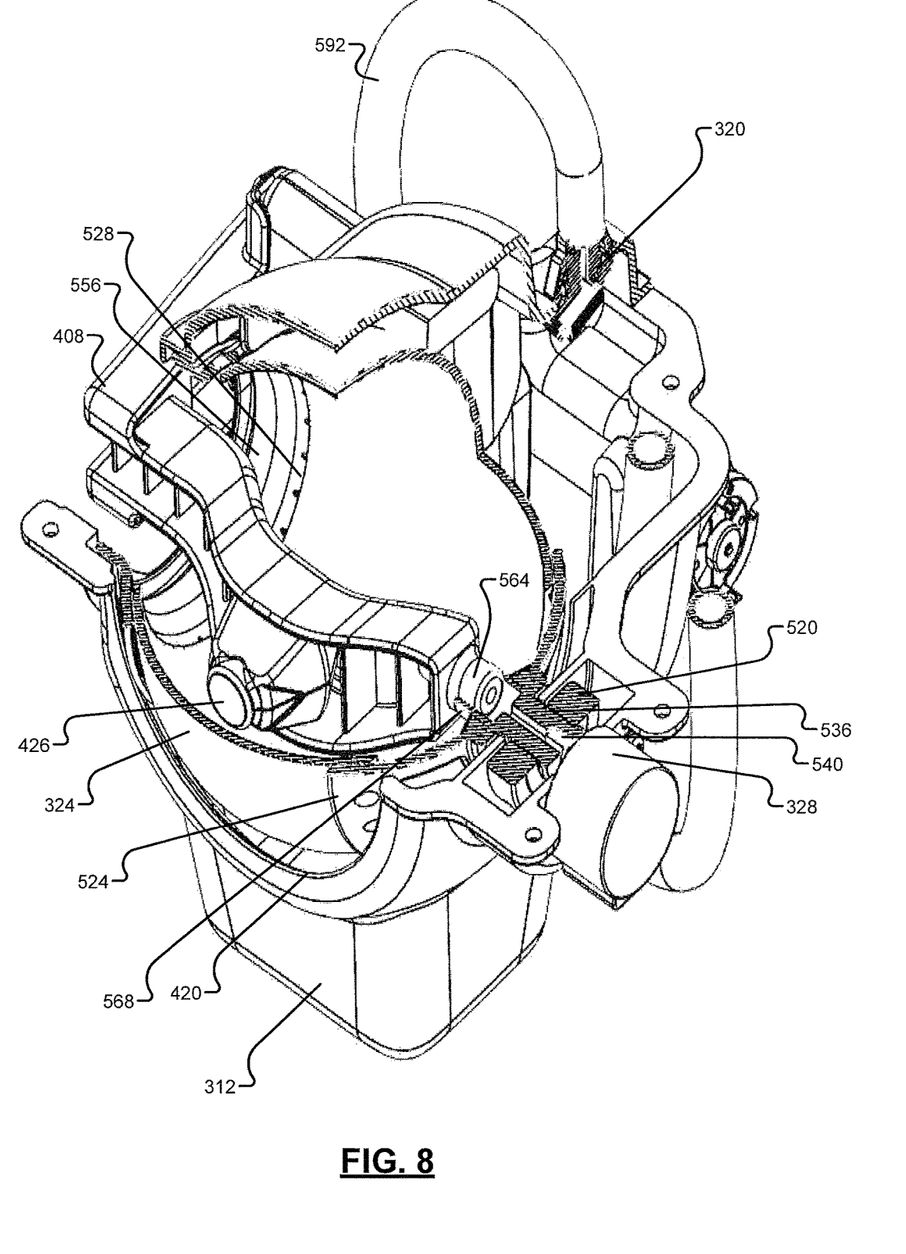
FIG. 8 is a partial section view of an example implementation of a self-cleaning camera device.
Figure 9:
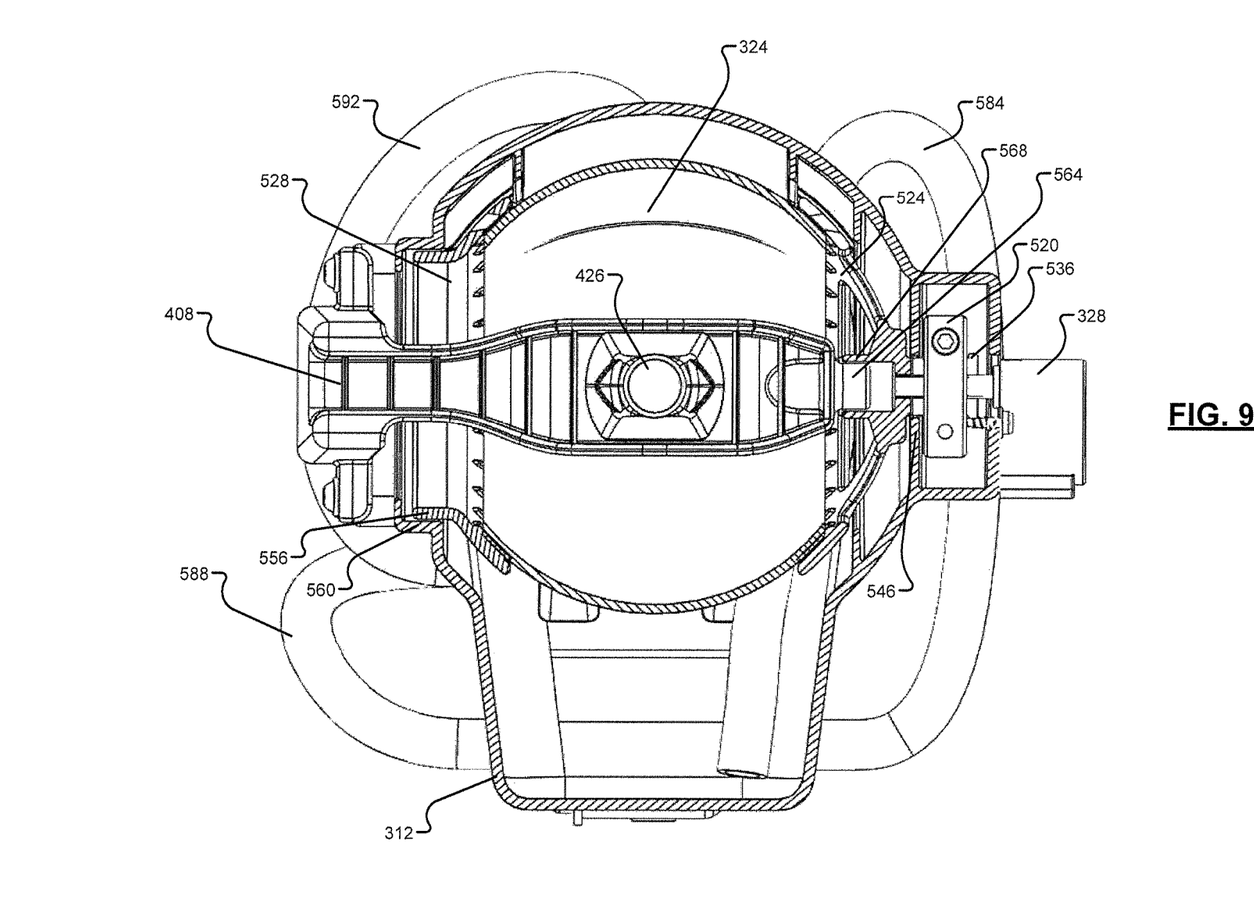
FIG. 9 is a partial section view of an example implementation of a self-cleaning camera device.
Figure 10:
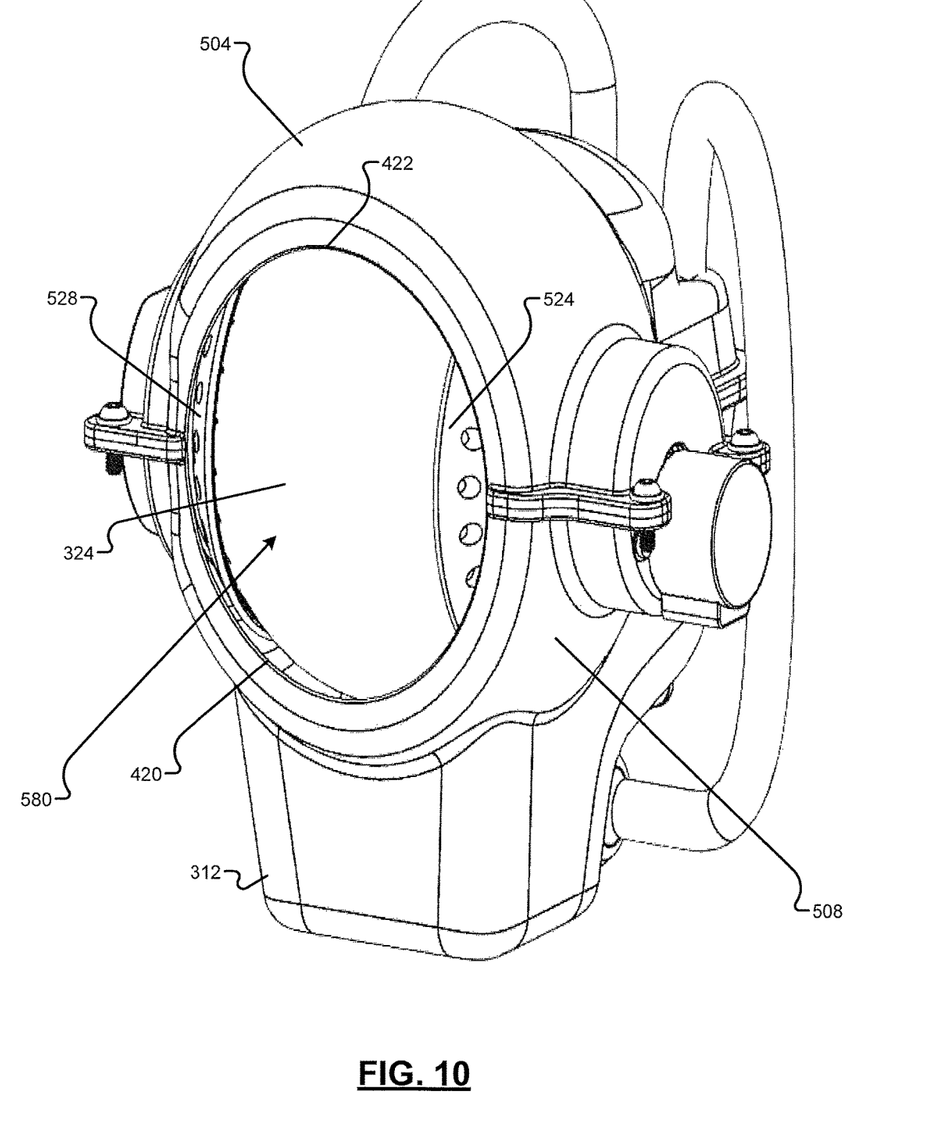
FIG. 10 is a perspective view of an example implementation of a self-cleaning camera device.

FIG. 7 is an exploded view of an example implementation of a self-cleaning camera device. FIG. 8 is a partial section view of an example implementation of a self-cleaning camera device from above and beside the self-cleaning camera device. FIG. 9 is a partial section view of an example implementation of a self-cleaning camera device from in front of the self-cleaning camera device. FIG. 10 is a perspective view of an example implementation of a self-cleaning camera device from in front and beside the self-cleaning camera device.

Referring to FIGS. 7-10, the housing 314 may include an upper housing member 504 and a lower housing member 508. The upper housing member 504 and the lower housing member 508 are fixed together, such as via screws 512. The upper and lower housing members 504 and 508 may alternatively be fixed together in another manner, such as via bolts or an adhesive. The wiping member 340 may be fixed or formed within the upper housing member 504. The wiping member 340 may be arc (convex) shaped, for example, to better directly contact a larger portion of the rotating spherical member 324.

Before the upper and lower housing members 504 and 508 are fixed together, a motor and camera assembly 516 is assembled and is disposed within the lower housing member 508. Alternatively, the housing 314 may be a single piece, and the motor and camera assembly 516 may be inserted into the housing 314 through an opening in the housing 314.

The motor and camera assembly 516 includes the electric motor 328 and the camera 336. As an example, the motor and camera assembly 516 may also include a bearing 520, first and second cupping members 524 and 528, and the support member 408. The camera 336 is fixed within an opening 532 in the support member 408. The first cupping member 524 may include a hollow driveshaft 536 that is coupled to a driveshaft 540 of the electric motor 328. Rotation of the driveshaft 540 of the electric motor 328 drives rotation of the first cupping member 524. The bearing 520 encircles the hollow driveshaft 536 of the first cupping member 524, allows the first cupping member 524 to rotate, and sits within a bearing housing 544 the housing 314. The hollow driveshaft 536 may be supported by a support member 546 of the lower housing member 508.

The first cupping member 524 is fixed to the rotating spherical member 324 such that the rotating spherical member 324 rotates with the first cupping member 524. For example, the first cupping member 524 may include a plurality of holes 548, and adhesive may be applied at the holes 548 to fix the rotating spherical member 524 to the first cupping member 524. However, the first cupping member 524 may be fixed to the rotating spherical member 524 in another manner.

The second cupping member 528 is also fixed to the rotating spherical member 324 such that the second cupping member 528 rotates with the rotating spherical member 324. For example, the second cupping member 528 may include a plurality of holes 552, and an adhesive may be applied at the holes 552 to fix the rotating spherical member 524 to the second cupping member 528. However, the second cupping member 528 may be fixed to the rotating spherical member 524 in another manner.

The second cupping member 528 includes a flange 556. The flange 526 may be supported by a support member 560 of the lower housing member 508.

As shown in FIG. 7, the rotating spherical member 324 may be frusto-spherical. Frusto-spherical may refer to a solid having the shape of a frustum of a sphere. In other words, frusto-spherical may mean a sphere having one or two portions that have been cut off by one or two planes, respectively. The remaining portion of the sphere has a convex surface.

The rotating spherical member 324 may be frusto-spherical, for example, for insertion of the motor and camera assembly 516 into the rotating spherical member 324. The support member 408 may include an extension member 564 that connects with (e.g., extends into) and is supported by a receiving member 568 of the first cupping member 524. The support member 408 is fixed to the housing 314, such as via one or more screws 572, and does not rotate with the rotating spherical member 324. The support member 408 supports the camera 336 at a fixed position within the rotating spherical member 324 while the rotating spherical member 324 rotates about axis 576.

The axis 576 is perpendicular to opening 578 in the rotating spherical member 324. A plane of the opening 578 of the rotating spherical member 324 is also perpendicular to a plane of the opening 580 in the housing 314. The motor and camera assembly 516 may be inserted through the opening 578.

The support member 408 may extend, at the location of the camera 336, toward the opening 580 in the housing 314 and away from the axis 576. The extension of the support member 408 toward the opening 580 may position the camera 336 more toward the rotating spherical member 324, for example, to maximize a possible FOV of the camera 336 and not obstruct the FOV of the camera 336, to minimize light refraction angle, and/or to minimize image distortion of the camera 336.

Washer fluid flows from the camera reservoir 312 to the filter 332 via a first hose 584. Washer fluid flows from the filter 332 to the second pump 316 via a second hose 588. Washer fluid flows from the second pump 316 to the cleaning nozzle 320 via a third hose 592.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A self-cleaning camera device for a vehicle, the self-cleaning camera device comprising:
    a housing that has a first opening and that includes a reservoir configured to hold a fluid within the housing;
    a frusto-spherical member that is transparent, that is located within the housing, that includes an inner cavity defined by an inner surface, and that includes an exterior surface;
    an electric motor configured to rotate the frusto-spherical member in a predetermined direction about an axis,
    wherein the axis is perpendicular to a second opening in the frusto-spherical member;
    a cupping member that is fixed to the frusto-spherical member and that includes a first shaft that is coupled to a second shaft of the electric motor;
    a support member that (i) extends through the second opening of the frusto-spherical member and into the inner cavity of the frusto-spherical member and (ii) does not rotate with the frusto-spherical member;
    a camera that is located on the support member within the inner cavity of the frusto-spherical member and that includes a lens that one of: (i) faces the first opening in the housing; (ii) extends into the first opening in the housing; and (ii) extends outwardly past the first opening in the housing; and
    a wiping member that directly contacts the exterior surface of the frusto-spherical member and that is configured to wipe the fluid from a portion of the exterior surface of the frusto-spherical member before the portion of the exterior surface of the frusto-spherical member is rotated in front of the lens of the camera.

2. The self-cleaning camera device of claim 1 further comprising a nozzle configured to spray the fluid onto a second portion of the frusto-spherical member before the second portion of the frusto-spherical member rotates to the wiping member.

3. The self-cleaning camera device of claim 2 wherein the nozzle is configured to spray the fluid onto the second portion of the frusto-spherical member outside of a field of view (FOV) of the camera.

4. A system comprising:
    the self-cleaning camera device of claim 2; and
    an electric pump configured to draw the fluid from the reservoir in the housing and pumps the fluid to the nozzle.

5. The system of claim 4 further comprising a filter, wherein the electric pump is configured to draw the fluid from the reservoir in the housing through the filter.

6. The self-cleaning camera device of claim 1 wherein a second portion of the exterior surface of the frusto-spherical member contacts the fluid within the reservoir before the second portion of the frusto-spherical member rotates to the wiping member.

7. A system comprising:
    the self-cleaning camera device of claim 6; and
    an electric pump configured to pump the fluid from a second reservoir into the reservoir of the housing.

8. The self-cleaning camera device of claim 1 wherein the support member supports the first shaft of the cupping member.

9. The self-cleaning camera device of claim 1 further comprising a second cupping member that is fixed to the frusto-spherical member.

10. The self-cleaning camera device of claim 9 wherein:
    the second cupping member includes a flange that extends outwardly away from the frusto-spherical member; and
    the housing includes a support member that supports the flange of the second cupping member.

11. The self-cleaning camera device of claim 1 wherein:
    the support member includes a portion that extends away from the axis and toward the first opening in the housing; and
    wherein the camera is located on the portion of the support member that extends away from the axis and toward the first opening in the housing.

12. The self-cleaning camera device of claim 1 wherein the wiping member includes a convex surface that contacts the exterior surface of the frusto-spherical member.

13. The self-cleaning camera device of claim 1 wherein a first plane of the first opening of the housing is perpendicular to a second plane of the second opening of the frusto-spherical member.

14. The self-cleaning camera device of claim 1 wherein the housing includes a sealing member around the first opening in the housing.

15. The self-cleaning camera device of claim 14 wherein the sealing member directly contacts at least a portion of the frusto-spherical member.

16. The self-cleaning camera device of claim 14 wherein the sealing member does not contact any portion of the frusto-spherical member.

17. The self-cleaning camera device of claim 1 wherein the fluid is washer fluid.

18. A vehicle comprising:
    the self-cleaning camera device of claim 1,
    wherein the camera is arranged to capture images of behind the vehicle; and
    a control module configured to begin applying power to the electric motor when a transmission of the vehicle is in reverse.

19. A vehicle comprising:
    the self-cleaning camera device of claim 1,
    wherein the camera is arranged to capture images outside of the vehicle; and
    a control module configured to begin applying power to the electric motor when an enabling condition is satisfied.

* * * * *